United States Patent [19]
Loersch

[11] 3,809,386
[45] May 7, 1974

[54] DEVICE FOR ASSOCIATING MOUNTS FOR SLIDE TRANSPARENCIES

[76] Inventor: Johannes Loersch, 4153 Huls Krefelder Strasse 40, Germany

[22] Filed: Feb. 8, 1971

[21] Appl. No.: 113,384

[52] U.S. Cl. ............................... 270/58, 40/158 B
[51] Int. Cl. ............................................. B65h 39/02
[58] Field of Search ............ 270/58, 59, 12, 45, 46, 270/52; 40/158 B

[56] References Cited
UNITED STATES PATENTS

| | | | |
|---|---|---|---|
| 3,370,843 | 2/1968 | Woodside | 270/58 |
| 3,175,821 | 3/1965 | Gibson | 270/58 |

Primary Examiner—Robert W. Michell
Attorney, Agent, or Firm—Mason, Mason & Albright

[57] ABSTRACT

A device for mounting photographic slide transparencies in mounts, each mount comprising a pair of mount halves wherein one mount half is placed on top of the other and the transparency is positioned between them; the device having a horizontal conveyor system for conveying the lower half mounts under a spaced resilient horizontally disposed tongue with a free after end which supports the upper mount half and cooperates with a pivotable lever which it underlies to retain the upper mount half approximately parallel to it until the mount halves are pressed together by the pivotable lever. Both the upper and lower mount halves are moved by vertically extending catches and are so spaced on the conveyor that the pivotable lever presses the succeeding mount halves together in a downward movement due to gravity when the leading already joined mount is carried from under the after free end of the pivotable lever. A brake is provided at the side of the conveyor system to bias the mount halves snugly against the catches behind the free end of the tongue to insure their proper alignment.

6 Claims, 4 Drawing Figures

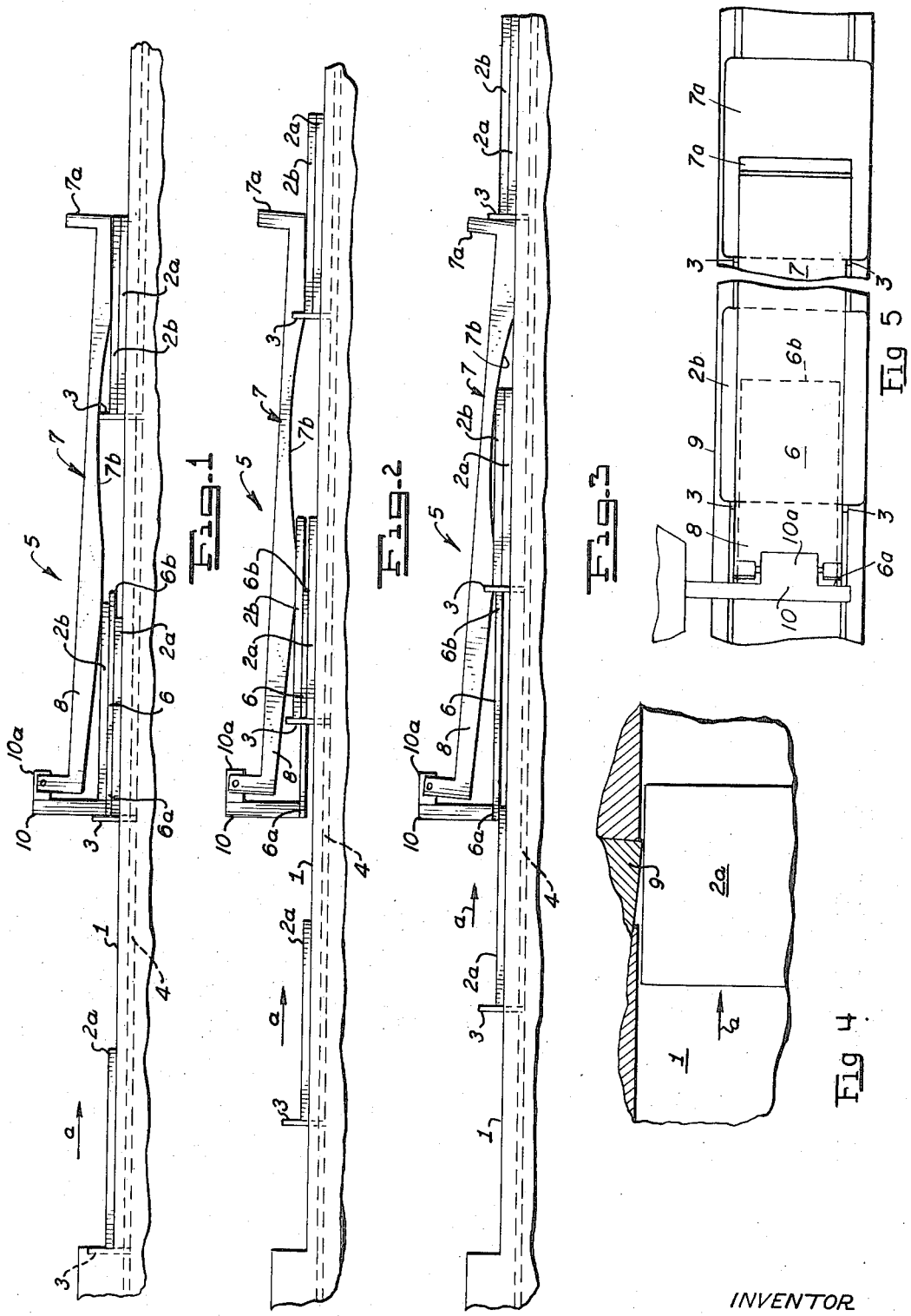

DEVICE FOR ASSOCIATING MOUNTS FOR SLIDE TRANSPARENCIES

SUMMARY OF THE INVENTION

The purpose of the invention is to provide a device for feeding and applying in a reliable and relatively simple manner an upper mount half onto a lower mount half between which is carried a slide transparency. An important aspect of the invention lies in the provision of a tongue which is spaced above the conveyor so that the lower mount halves are carried under it by vertically extending catches which move with the conveyor and which is resilient and capable of bending in a downward direction toward the conveyor track. The tongue serves as a support for the upper mouth half and also cooperates with a slewable or pivotable lever (which is coupled to a fixed bar above the tongue and reaches beyond the free end of the tongue) to position the upper mount half onto the lower mount half. The upper and the lower mount halves are then carried together by the catches along the conveyor. As the upper mount half moves with the lower mount half with the tongue between them, the tongue and pivotable lever cooperate to hold the upper mount half approximately parallel to the surface of the tongue as it is moved therealong and until it moves off the tongue and is positioned in the lower mount half. To this end, a portion of the pivotable lever is curved so as to prevent this particular portion from biasing the upper mount half until the lever functions to position same on the lower mount half as the upper mount half leaves the tongue. For this purpose, such portion of the pivotable lever extends a little less than the length of the side edge of one transparency mount whereby the pivotable lever causes a positive downward motion in the upper mount half as it is carried from the end of the tongue. Moreover, the free end of the pivotable lever is shaped to be approximately parallel with the mount moving thereunder to provide that the mount halves are evenly pressed together as they are carried under the end of the pivotable lever. The distance between the catches is approximately 2.1 times the length of the side edges of the transparency mount and, due to this dimension, the pivotable lever moves downwardly due to gravity when mount halves (which it has just pressed together) pass from beneath its free end. This downward movement serves to position the succeeding mount halves, which at that moment are being pressed together between the lever and conveyor, in the proper alignment. The length of the pivotable lever is approximately three times as long as the side edges of the transparency mounts. Finally, the invention provides that along the course of the conveyor a braking device be applied to the side edges of the transparency mounts extending transversely relative to the free end of the tongue in order to insure that they are positioned snugly against the catches extending from the conveyor.

Other objects, adaptabilities and capabilities will appear as the description progresses, reference being had to the accompanying drawings.

BRIEF DESCRIPTION OF THE DRAWINGS

FIG. 1 illustrates the components of the invention just prior to the displacement of an upper mount half relative to the resilient tongue;

FIG. 2 is similar to FIG. 1 but shows the mount halves after being displaced about half-way along the resilient tongue;

FIG. 3 is similar to FIGS. 1 and 2 showing the mount halves in position after immediately having been displaced from the resilient tongue;

FIG. 4 is a fragmentary schematic plan view in partial section with the structure above the conveyor removed in order to illustrate the braking element bearing against a lower mount half; and FIG. 5 is a top view of the apparatus with mount halves located as shown in FIG. 2.

DESCRIPTION OF THE PREFERRED EMBODIMENT

A transport track 1 is carrying three lower mount halves 2a, in which a slide transparency has already been inserted, in the direction of arrow a. Mount halves 2a are carried along transport track 1 by means of vertically extending catches 3 which are mounted on a rotating endless chain 4 or the like. A device designated generally by reference numeral 5, for feeding and applying the upper mount halves 2b to the lower mount halves 2a, is mounted so as to be spaced above the transport track 1. Device 5 comprises a resilient tongue 6 which has its forward end 6a affixed to a bar 10 supported above transport track 1 and its other end 6b is free. Bar 10 may be secured on device 5 relative to transport track 1 by any appropriate means within the skill of the art such as, for example, to walls which may be provided to extend vertically on both sides of track 4. Tongue 6 is sufficiently resilient so that it is bendable in a downwardly direction towards the transport track 1 and at the same time is capable of supporting the upper mount half 2b.

Above tongue 6, a pivotable lever 7, pivotably coupled to a bracket 10a extending from bar 10, is sufficiently wide so that it covers the whole of tongue 6. The free end 7a of lever 7 either bears on the transport track 1 or bears on top of an upper mount half 2b as will be described hereinafter. It will be noted that the lower end of the lever 7 has a shaped or curved cam part 7b which provides space for an upper mount half 2b. When the free end 7a is moved by gravity from the top of the forward upper mount half 2b to the transport track 1 as shown in FIG. 3, the forward end of part 7b is brought to bear on the upper mount half 2b thereunder. It will also be noted that in the position shown in FIG. 3, the space between the forward end 8 of lever 7 and the free end 6b of tongue 6 is closed.

Part 7b is shaped so that it is approximately parallel with tongue 6 and also with the transport track 1 when in the position shown in FIGS. 1 and 2, and the effective length of the part 7b (from the end of tongue 6 to the forward end of upper mount half 2b as seen in FIG. 3) is slightly less than the length of the side edge of a transparency mount. Also the lower edge of free end 7a of lever 7 is parallel to transport track 1 when in position as shown in FIGS. 1 and 2. Finally, as shown in FIG. 4, a brake device 9 is provided, transversely spaced from part 7b which serves to bear against and slow down both mount halves, preferably the lower mount half 2a, to insure that they are properly aligned when one is placed on the other.

In operation, an upper mount half 2b is placed on tongue 6 in a position as shown in FIG. 1 and at the same time, lower mount halves 2a are being moved by catches 3 in the direction of arrow *a* on transport track 1. The centrally located lower mount half 2*a* is immediately under the tongue 6. As illustrated by FIG. 2, catches 3 moving in the direction of arrow *a* move the lower mount half 2*a* and also the upper mount half 2*b* in the same direction together along tongue 6. At the same time, the most forwardly of mount halves 2*a* and 2*b* located under free end 7*a* are being pressed together by the weight of the lever 7. For the mount halves 2*a* and 2*b*, which are being carried along relative to tongue 6 by catches 3, a brake device 9 is provided which bears mount halves the edges of such mounthalves 2*a* and 2*b* and provides for their exact positioning. The centrally located upper mount half 2*b*, as shown in FIG. 2, is carried by catches 3 (which bear against mount halves 2*a* and 2*b* on either side of tongue 6 and lever 7) between tongue 6 and part 7*b* of the lever 7 so as to be retained approximately parallel to the lower mount half 2*a* and to transport track 1. However, as it moves to the position shown in FIG. 3, free end 7*a* of lever 7 is no longer supported by the most forward mount half 2*b* and free end 7*a* is urged by gravity toward transport track 1 to the position shown in FIG. 3 whereupon part 7*b* presses the mount half 2*b* down and against the lower mount half 2*a* while both mount halves are urged against catches 3 by brake device 9 to achieve exact alignment of the mount halves. Thereafter the mount halves are pressed together by free end 7*a* as they are carried under same by transport track 1.

It will be appreciated that elements and groups of elements which are conventional and generally widely known in the field to which the invention pertains have not been described in detail inasmuch as their exact nature or type is not necessary for an understanding and use of the invention by a person skilled in the art. Further, although the preferred embodiment of the invention has been described, it is to be understood that it is capable of other adaptations and modifications.

Having thus described my invention, what I claim as new and desire to secure by Letters Patent of the United States is:

1. A device for placing one mount half for mounting transparencies on top of the other mount half which comprises:

a transport track for conveying said mount halves along a predetermined path, a tongue spaced above and longitudinally aligned with said transport track, bar means, said tongue secured by said bar means on its forward portion and free on its after end which is thereby oriented to extend in the direction of travel of said moving halves by said transport track, a pivotable lever over said transport track, said lever being coupled to said bar means above said tongue and extending rearwardly therefrom in the direction of travel of said mount halves by said transport track beyond said tongue above said transport track, there being sufficient space between said tongue and said lever for placing an upper mount half on said tongue and the after end of said lever being free, moving catch means included in said transport track and extending therefrom, means for laterally positioning said mount halves mounted which is substantially adjacent to the free end of said tongue, said catch means adapted to move an upper mount half from said tongue and a lower mount half on said transport track along said predetermined path in juxtaposition whereby when the upper mount half is moved by said catch means from the free end of said tongue and is laterally positioned by said lateral positioning means it is received in alignment on the underlying lower mount half, a portion comprising cam means included in said lever cooperating with said tongue holding the upper mount half spaced above and approximately parallel to the underlying lower mount half as they are moved by said catch means relative to said tongue and are evenly pressed together after they are carried by said catch means from the end of said tongue.

2. A device in accordance with claim 1 wherein said tongue is composed of a material sufficiently resilient to be bendable towards said transport track due to the weight of said lever, while cooperating with said lever portion for holding said upper mount half as it is moved relative thereto.

3. A device in accordance with claim 2 wherein said lever portion comprises a lower side of said lever which is shaped to extend approximately parallel to said transport track behind said free end of said tongue for a distance slightly less than the length of the mount halves along their side edges.

4. A device in accordance with claim 2 wherein the free end of said lever has a lower side which is substantially parallel to the upper side of said tongue.

5. A device in accordance with claim 2 wherein the distance between said catches along said transport track is about 2.1 times the length of the mount halves along their side edges and said lever is about three times said length whereby the free end of said lever is displaced from above mount halves travelling thereunder along said transport track at about the same time as an upper mount half is moved from the free end of said tongue into an underlying lower mount half and thereby pressing said mount halves together.

6. A device in accordance with claim 2 wherein said lateral positioning means comprises a braking element which is provided relative the sides of said tongue for urging the lower mount half moving thereunder against said catches moving same for providing its alignment with said upper mount half.

* * * * *